United States Patent [19]

Faber et al.

[11] Patent Number: 4,634,592

[45] Date of Patent: Jan. 6, 1987

[54] PROCESS FOR THE MANUFACTURE OF AQUATIC BAIT BLOCKS

[75] Inventors: Jerry L. Faber, Decatur; Richard W. Kent, Jr., Ft. Wayne, both of Ind.

[73] Assignee: Central Soya Company, Inc., Ft. Wayne, Ind.

[21] Appl. No.: 725,982

[22] Filed: Apr. 22, 1985

[51] Int. Cl.⁴ ............................................. A23K 1/00
[52] U.S. Cl. ....................................... 426/1; 426/658; 426/805
[58] Field of Search ................... 426/1, 805, 658, 74, 426/2

[56] References Cited

U.S. PATENT DOCUMENTS 4,160,041  7/1979  Schroeder et al. ................. 426/658

FOREIGN PATENT DOCUMENTS 2086707A  5/1982  United Kingdom .

Primary Examiner—George Yeung
Attorney, Agent, or Firm—Tilton, Fallon, Lungmus & Chestnut

[57] ABSTRACT

A process for the manufacture of aquatic bait blocks wherein filler material, lime, molasses and condensed fish solubles are made into relatively small blocks having a water degradability of from about 18 to 96 hours.

5 Claims, 1 Drawing Figure

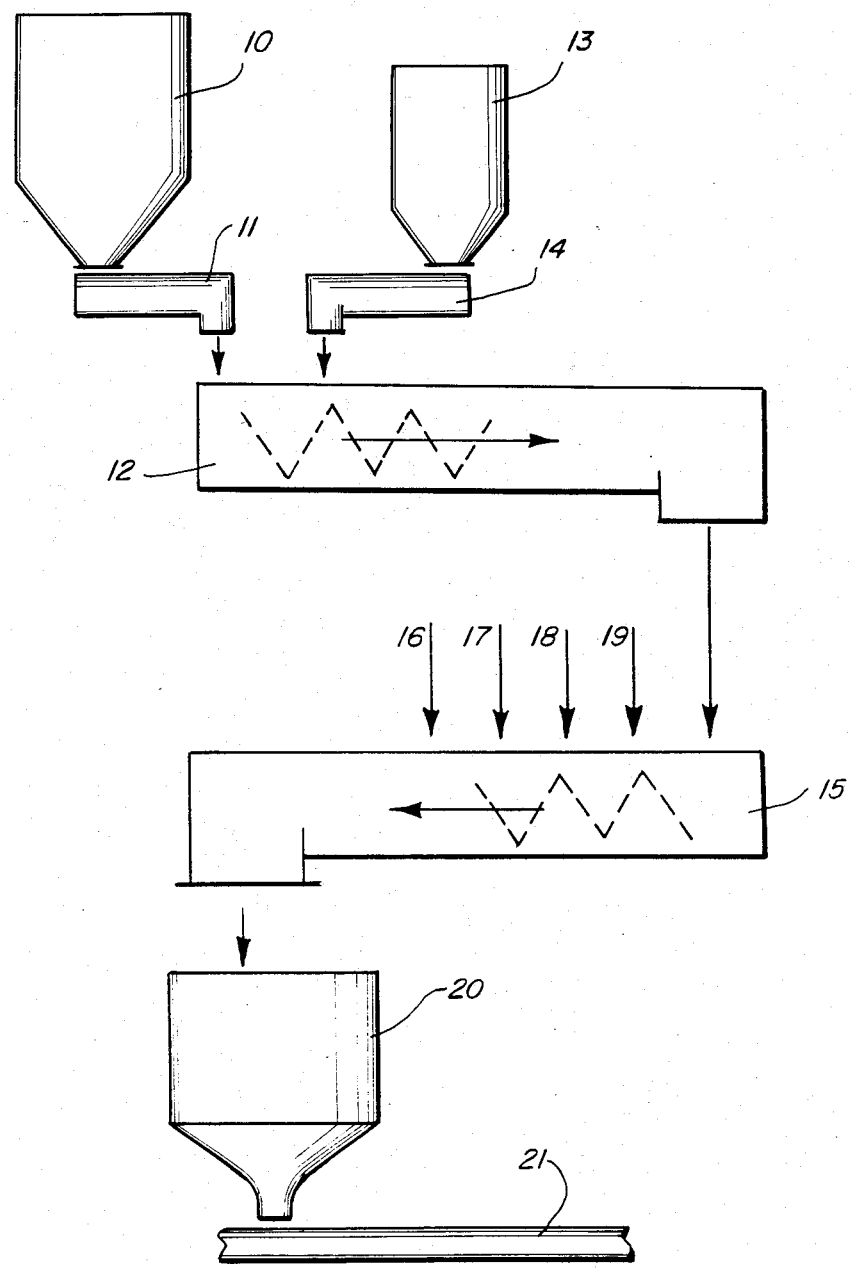

PROCESS FOR THE MANUFACTURE OF AQUATIC BAIT BLOCKS

BACKGROUND OF THE INVENTION

This invention relates to a process for the manufacture of aquatic bait blocks and, more particularly, to bait blocks employing hardening materials such as molasses or monosodium phosphate and lime.

Feedstuffs produced in block form are currently used to supplement the daily nutrient needs of cattle. The "cattle blocks" are processed by blending specific liquid and dry feedstuffs and adding a chemical catalyst to cause hardening of the mixture. The formed blocks, unlike other supplemental blocks, are capable of maintaining shape when exposed to natural outside environmental conditions. In addition, the cattle blocks can be produced in a wide range of weights, usually 50 to 500 pounds. Furthermore, the hardness of the block can be varied to withstand various environmental conditions to produce any desired rate of disintigration.

Illustrative of the cattle feed block technology is published United Kingdom application No. 2 086 707. The cattle-type blocks do not indicate the feasibility for use as aquatic bait.

Crustaceans and fish are caught in live catch traps using natural baits and manufactured baits. Natural baits such as scrap fish are effective attractants for capturing crustaceans and fish. However, natural baits are expensive and difficult to handle and store. Consequently, fishermen have been attempting to replace natural baits with lower-cost, manufactured baits. The manufactured bait is produced as large cubes, generally cylindirical in shape, and is used at a rate of 5 to 30 cubes per trap.

Manufactured cube baits have the advantages of easier handling and storage with longer shelf life than natural baits. However, manufactured baits often fail to provide the flexibility in rate of disintegration to meet the varying time schedules used by fishermen in collecting their daily catch and different water conditions. In addition, manufactured baits require more labor than natural baits because several cubes must be deposited in each trap compared to depositing one fish per trap. Furthermore, manufactured baits do not yield the same pounds of catch per trap as natural baits. Consequently, traps must be baited with both natural and manufactured baits, which increases the time spent baiting each trap and increases bait cost per trap.

A prior art search revealed the following references, which are briefly described hereinafter.

Gunter U.S. Pat. No. 3,889,007 references the use of fish extracts, sea water and organic binders which the inventive process does not require—sea water or any of the organic binders listed in the patent. Goldstein U.S. Pat. No. 4,150,162 uses plaster of paris (calcium sulfate) as a hardening agent to encapsulate freeze-dried fish extract. Neither of these products is used in the instant process. Orth U.S. Pat. No. 4,206,236 discusses the use of sugars common to molasses but used an extruder rather than chemicals to produce a formed bait block. Brown U.S. Pat. No. 4,212,896 appears to be a variation of the Orth patent, wherein the extruded food contains molasses. Enkura Japanese patent No. 149,597 uses calcium oxide (quicklime) but only in the presence of carbon dioxide gas to convert the calcium hydroxide to calcium carbonate. Molasses or sugars are not mentioned as necessary in the reaction. However, the patent does reference the use of fish solubles material blended with calcium oxide (quicklime).

SUMMARY OF INVENTION

The invention employs combinations of ingredients to give a block resistant to rapid water degradation and employs in the preferred embodiment the reaction of lime and molasses to provide a product suitable for a new use as an aquatic bait. The bait blocks are formed by combining blends of liquid ingredients and dry ingredients. The liquid phase includes by weight in the preferred embodiment from about 5% to 25% condensed fish solubles and liquid molasses 25-50%. The dry ingredients by weight are ground filler material such as corn or peanut hulls, about 0-35%, ground limestone, about 0-35%, and dolomitic lime or Kemidol oxide, about 10-30%. A suitable range of equivalents can be employed for the above and with blocks from this formulation, the product resulting has a water degradability time of about 18-96 hours.

The invention is described in conjunction with the accompanying drawing, in which a schematic flow diagram is presented.

DETAILED DESCRIPTION

Aquatic bait blocks are 3 ounce to 16 ounce blocks of any desired shape and dimension. Preference is for a $3 \times 4 \times 1$ inch rectangular block.

The bait blocks are formed by combining blends of liquid ingredients and dry ingredients. The liquid phase includes by weight condensed fish solubles, 5-25%, and liquid molasses, 10-50%. The dry ingredients by weight are ground peanut hulls, 0-35%; ground limestone or salt, 0-35%; dolomitic lime (Kemidol oxide), 10-30%; and water 0-14%. Formulas one and two are example formulas. Formula three is for the production of white blocks which is advantageous with certain aquatic species. The bait block differs only in ingredient mix to the previously described blocks. The dry ingredients are monosodium phosphate, 10-60%, and calcium oxide 3-15%. Liquid ingredients are water, 10-50%, and condensed fish solubles 1-15%.

| Formula | Percent | | |
| --- | --- | --- | --- |
|  | #1 | #2 | #3 |
| Ground Corn | — | 14 | — |
| Ground Peanut Hulls | 13 | — | — |
| Limestone | 18 | — | — |
| Monosodium Phosphate | — | — | 50 |
| Dolomitic Lime | 18 | 25 | — |
| Calcium Oxide | — | — | 5 |
| Condensed Fish Solubles | 20 | 15 | 15 |
| Molasses | 25 | 46 | — |
| Water | 6 | — | 30 |

There are alternative ingredients for condensed fish solubles and molasses. Any animal by-products may replace condensed fish solubles. These may include fish meal, fish by-products, crustacean by-products, fish oil, meat by-products and poultry by-products. Molasses may include any sugar-based product in liquid or dry state. Mixtures of refined sugars and water may be used to replace molasses. When using molasseslike products in a dry state, water is added at 5% to 10% of the formula. Normally, the cured product has about 9% to about 12% water. However, the amount of added water can advantageously be in the range of about 5% to about 14% and the total water content before curing is of the order of about 15% to about 40%.

When molasses equivalents are employed, it is advantageous to maintain a degree brix of the same order as that of molasses. A value of at least 79.5% brix is needed for either liquid molasses or blends of water and sugars or water and dried molasses.

Several additives may be used to enhance the attractant nature of natural ingredients. These are anise oil, monosodium glutamate, monosodium aspartate, potassium aspartate, L-lysine hydrochloride and glycine.

Fat may be added to the mix at 0% to 5% of the formula. Fat may be advantageous to further control the rate of degradation by reducing the rate at which water penetrates the block.

Dolomitic lime is a blend of calcium oxide (58%), magnesium oxide (38%) and other mineral impurities. Dolomitic lime is produced by heating dolomite ore in a kiln. The heat converts the calcium carbonate and magnesium carbonate to their oxide forms. Calcium oxide can replace dolomitic lime in a range of 3-10%.

The ingredients are mixed in two phases in a continuous flow production system as shown in the attached drawing. The dolomitic lime and other dry ingredients are fed separately and blended in the dry mixer for 5-20 seconds. This dry mix is then mixed with the liquid ingredients in the wet mixer and discharged from the wet mixer into the filling machine. The filler dispenses the wet mix into cube trays at a rate of 30-90 pounds per minute. The filled cube trays are then stacked for cooling and later loaded into cardboard boxes. The boxes are advantageously wax-coated to protect from exposure to moisture. For optimum results, the combined mixing and filling time should not exceed 5 minutes. The blocks cure at ambient temperature in 6 to 24 hours resulting in a block having a water degradability time for 18-96 hours. The set-up time and rate of reaction can be varied by the level of dolomite lime relative to the level of sugar-based ingredient and added water. Degradation time is a function of hardness and texture related to the ratios of the ingredients.

The use of dolomitic lime or Kemidol oxide provides an advantageous uniqueness to this molasses block technology. Dolomitic lime is less reactive than calcium oxide. The slower reaction of dolomitic lime with sugar-based compounds provides for better control of mixing and curing time. This allows for a greater margin of error in the addition of the calcium oxide source without dramatically affecting the mixing time, curing time or block hardness.

In the specific practice of the invention, and referring to the drawing, the dry feed ingredients are provided in a hopper 10 and delivered through a feeder 11 to a horizontally disposed dry mixer 12. In analogous fashion, the chemical hardener, viz., dolomitic lime or Kemidol oxide in the illustration given is provided from a hopper 13 and introduced into the mixer 12 via a feeder 14.

After mixing is substantially complete, the dry mix is advantageously transferred to a wet mixer 15 which has a number of inlet ports. The ports 16, 17, 18 and 19 are advantageously used for molasses, condensed fish solubles, fat and water as required.

After the wet mixing is complete, the product is delivered to a filler 20 from which cubes are developed in the trays carried by the conveyor belt 21.

While in the foregoing specification a detailed description of an embodiment of the invention, has been set down for the purpose of illustration, many variations in the details herein given may be made by those skilled in the art without departing from the spirit and scope of the invention.

We claim:

1. A process for the manufacture and use of aquatic bait blocks comprising:
   mixing in weight proportion in the final block up to about 35% ground filler material selected from the group consisting of corn and peanut hulls, up to about 35% inert ground mineral material, and about 10-30% dolomitic lime to produce a dry mixture with the proviso that the dry mixture contains an effective amount of ground filler material or inert ground mineral material,
   mixing said dry mixture with a liquid mixture including about 5-25% of an animal product selected from the group consisting of condensed fish solubles, fish meal, fish by-products, crustacean by-products, fish oil, meat by-products and poultry by-products, and about 25-50% of a sugar-based product having a brix approximating that of molasses to provide a wet mixture,
   filling the fluid mixture into cubicle containers to provide blocks with the combined mixing and filling time being less than about 5 minutes, and curing the blocks at ambient temperature for up to about 24 hours to provide an aquatic bait block having a water degradability of from about 18 to 96 hours and installing an aquatic block in fishing waters as a bait.

2. The process of claim 1 in which the amount of dolomitic lime is selected to regulate the abovementioned combined mixing and filling time.

3. The process of claim 2 in which the time of mixing to produce said dry mixture and wet mixture is from about 5 to 20 seconds.

4. The process of claim 1 in which said sugar-based product is molasses.

5. The process of claim 4 in which said molasses is in a dry state and augmented by from about 5 to about 10% water by weight of the final aquatic bait block.

* * * * *